US007012966B2

(12) United States Patent
Li (10) Patent No.: US 7,012,966 B2
(45) Date of Patent: Mar. 14, 2006

(54) CHANNEL ESTIMATION FOR WIRELESS SYSTEMS WITH MULTIPLE TRANSMIT ANTENNAS

(75) Inventor: Ye Li, Holmdel, NJ (US)

(73) Assignee: AT&T Corp., Bedminster, NJ (US)

( * ) Notice: Subject to any disclaimer, the term of this patent is extended or adjusted under 35 U.S.C. 154(b) by 704 days.

(21) Appl. No.: 09/861,811

(22) Filed: May 21, 2001

(65) Prior Publication Data

US 2003/0021332 A1   Jan. 30, 2003

(51) Int. Cl.
  *H04L 1/02* (2006.01)
(52) U.S. Cl. ............... 375/267; 375/343; 375/347; 370/343; 370/480
(58) Field of Classification Search ............... 375/260, 375/261, 285, 267, 299, 340, 343, 347; 370/343, 370/480, 483
See application file for complete search history.

(56) References Cited

U.S. PATENT DOCUMENTS 6,298,035 B1 * 10/2001 Heiskala ................. 370/206
6,473,393 B1    10/2002 Ariyavisitakul et al.
6,611,551 B1 *  8/2003 Jones et al. ............... 375/219

OTHER PUBLICATIONS

Li, Y., "Optimum Training Sequences for OFDM Systems with Multiple Transmit Antennas," Globecom'00, IEEE Globasl Telecommunication Conference, vol. 3 of 3, Nov. 27, 2000.
Li, et al., "Channel Estimation of OFDM Systems with Transmitter Diversity in Mobile Wireless Channels," IEEE Journal on Selected Areas in Communications, vol. 17, No. 3, Mar. 1999, 461.
Copy of European Search Report dated Dec. 6, 2004 for corresponding European Patent Application No. 02253493.7.

* cited by examiner

*Primary Examiner*—Dac V. Ha (57) ABSTRACT

In various embodiments, techniques are provided to determine channel characteristics of various communication systems such as OFDM systems or systems using a plurality of transmit antennas by using various sets of training symbols.

5 Claims, 4 Drawing Sheets

CHANNEL ESTIMATION FOR WIRELESS SYSTEMS WITH MULTIPLE TRANSMIT ANTENNAS

BACKGROUND OF THE INVENTION

1. Field of Invention

This invention relates to channel estimation in wireless systems.

2. Description of Related Art

As wireless communications systems are deployed around the world, the importance of providing clear and cost-effective communication services increases. Unfortunately, providing clear communications can require mitigating various obstacles such as inter-symbol-interference (ISI). To reduce ISI, a technique known as orthogonal frequency division multiplexing (OFDM) can be used. Orthogonal frequency division multiplexing is a communication paradigm where a single communication channel is divided into many narrow sub-bands, which then can be transmitted in parallel. By transmitting symbols in this fashion, the duration of each symbol can be dramatically increased, which can greatly reduce or completely eliminate ISI problems.

Unfortunately, individual sub-bands within an OFDM transmission are subject to Rayleigh fading, especially when used in mobile communication systems. While the effects of Rayleigh fading can be mitigated by using multiple transmitter and/or receiver antennas, estimating the channel characteristics for all transmitter-receiver antenna pairs can be difficult and computationally intensive. Accordingly, there is a need for apparatus and techniques that provide for better channel estimation.

SUMMARY OF THE INVENTION

In various embodiments, techniques are provided to determine channel characteristics of various communication systems such as OFDM systems or systems using a plurality of transmit antennas.

BRIEF DESCRIPTION OF THE DRAWINGS

The invention is described in detail with regard to the following figures, wherein like numerals reference like elements, and wherein.

DETAILED DESCRIPTION OF PREFERRED EMBODIMENTS

For wireless systems, channel estimation can be difficult and computationally intensive. For wireless communication systems such as orthogonal frequency division multiplexing (OFDM) systems that use multiple sub-bands, computational costs can increase since each sub-band must be estimated. Furthermore, because practical OFDM systems can require multiple transmit and/or receive antennas, the computational costs can rise to enormous levels as each sub-band for each transmit/receive antenna pair must be estimated.

Regardless of such computational costs, the difficulty of channel estimation is further complicated in the context of mobile systems because the characteristics of mobile channels can continually change over time. Thus, even if every OFDM sub-band for every transmit/receive antenna pair is accurately modeled at the start, middle or end of a communication, such channel estimates can be totally inadequate for other portions of the communication.

Generally, a mobile channel can be estimated by embedding a set of predetermined symbols known as training symbols at a transmitter and processing the training symbols at a receiver to produce a set of initial channel estimates. For continually changing channels such as mobile channels, the initial channel estimates can then be iteratively updated, or adapted, over time by appropriately processing subsequent data symbols. For example, a set of training symbols in a received signal can be used to estimate a set of initial channel estimates $\tilde{H}[n]$ that, in turn, can be used to equalize the received signal. The set of initial channel estimates $\tilde{H}[n]$ can then be updated using the equalized received signal to adapt the channel estimates to track the changing channel environment, i.e., $\tilde{H}[n+1]=\Phi[\tilde{H}[n]]$ where $\Phi$ is some predetermined function and n+1 relates to a frame of data processed after frame n.

Unfortunately, determining the various sets of channel estimates for communication systems having multiple antennas can require the formation and use of a cross-correlation matrix Q that must be subsequently inverted. As the size of the cross-correlation matrix Q grows, the computational requirements to invert Q can grow geometrically. While judiciously choosing training symbols can eliminate the need to invert the cross-correlation matrix Q, data symbols, unlike training symbols, cannot be so chosen.

However, by making various assumptions about the data symbols, sets of updated channel estimates can be estimated without inverting the cross-correlation matrix Q, and computational costs can be vastly reduced with only a minor degradation in the accuracy of the channel estimates.

Figure 1:
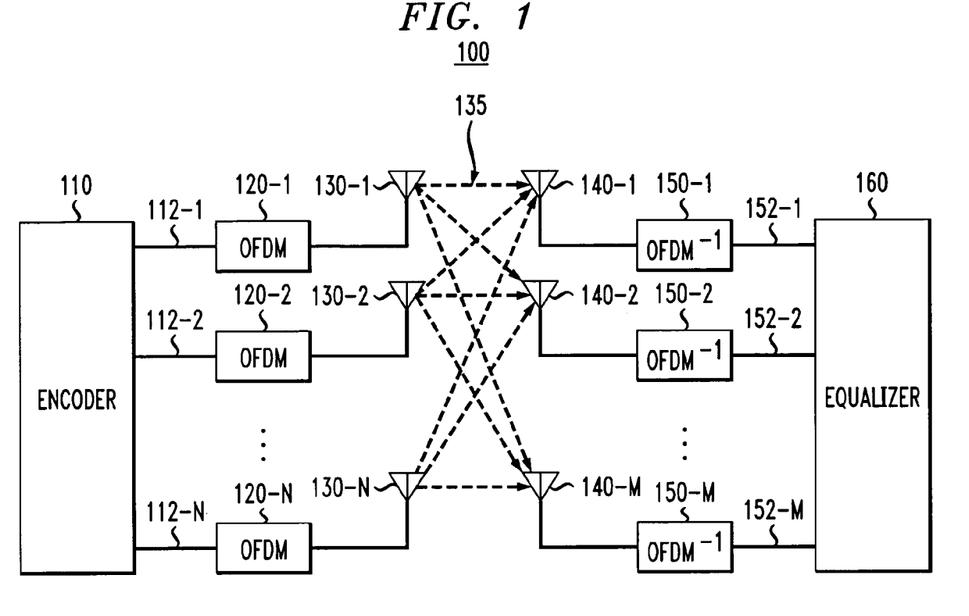
FIG. 1 is a block diagram of an exemplary communication system.

FIG. 1 is a block diagram of an exemplary transmission system 100. The transmission system 100 includes an encoder 110 having a number of associated OFDM transmitters 120-1, 120-2, . . . 120-N and respective transmit antennas 130-1, 130-2, . . . 130-N, and an equalizer 160 having a number of associated OFDM receivers 150-1, 150-2, . . . 150-M with respective receive antennas 140-1, 140-2, . . . 140-M.

In operation, the encoder 110 can form blocks of symbols that can be provided to the various OFDM transmitters 120-1, 120-2, . . . 120-N. The various OFDM transmitters 120-1, 120-2, . . . 120-N, in turn, can modulate the blocks of symbols into electromagnetic carriers such as radio-frequency waves that can then be transmitted using their respective transmitting antennas 130-1, 130-2, . . . 130-N. The various radio-frequency signals 135 can then be received by the receive antennas 140-1, 140-2, . . . 140-M and fed to their respective OFDM receivers 150-1, 150-2, . . . 150-M. The OFDM receivers 150-1, 150-2, . . . 150-M can then transform the received radio-frequency signals 135 into base-band signals, digitize the base-band signals and provide the digitized base-band signals to the equalizer 160.

The equalizer 160, in turn, can extract the symbols from the digitized base-band signals and perform various operations on the symbols.

As shown in FIG. 1, the radio-frequency signals 135 transmitted by each transmit antenna 130-1, 130-2, . . . 130-N can be subsequently received by each of the receiving antennas 140-1, 140-2, . . . 140-M. While FIG. 1 depicts the various communication channels as single direct paths between each transmit/receive antenna pair, it should be appreciated that each radio-frequency signal 135 can propagate from each transmit antenna 130-1, 130-2, . . . 130-N to each receive antenna 140-1, 140-2, . . . 140-M not only through a direct path, but can also propagate from each transmit antenna 130-1, 130-2, . . . 130-N to each receive antenna 140-1, 140-2, . . . 140-M through a variety of indirect paths (not shown).

The various radio-frequency signal paths for a particular transmit/receive antenna pair can produce a complex communication channel, which can be distinctly different from any other communication channel defined by another transmit/receive antenna pair. Generally, the channel characteristics of an individual mobile wireless channel i.e., the impulse response, can be described by Eq.(1):

$$h(t, \tau) = \sum_k \gamma_k(t) c(\tau - \tau_k), \quad (1)$$

where $\tau_k$ is the delay of the k-th path, $\gamma_k(t)$ is the corresponding complex amplitude for the k-th path, and c(t) is the shaping pulse for the k-th path whose frequency response is usually a square-root raised cosine Nyquist filter. When a communication channel is a mobile wireless channel, the motion of a vehicle can affect the complex amplitudes $\gamma_k(t)$'s, making each complex amplitude $\gamma_k(t)$ a wide-sense stationary (WSS), narrow-band complex Gaussian process, that can be independent for different signal paths.

From Eq. (1), the frequency response H(t,f) of a communication channel at time t can be described by Eq. (2):

$$H(t, f) \triangleq \int_{-\infty}^{+\infty} h(t, \tau) \exp(-j2\pi f \tau) d\tau \text{ or} \quad (2)$$

$$\triangleq C(f) \sum_k \gamma_k(t) \exp(-j2\pi f \tau_k) \quad (3)$$

where $$C(f) \triangleq \int_{-\infty}^{+\infty} c(\tau) \exp(-j2\pi f \tau_k). \quad (4)$$

For OFDM systems with proper cyclic extension and timing, the channel frequency response can be expressed by Eq.(5):

$$H[n, k] \triangleq H(nT_f, k\Delta f) = \sum_{l=0}^{K_o - 1} h[n, l] W_K^{kl} \quad (5)$$

where $$h[n, l] \triangleq h(nT_f, kT_f / K), \; W_K^{kl} = \exp(-j2\pi k l / K),$$

K is the number of sub-bands (tones) in an OFDM block, k is an index designating a particular sub-band, l is a time domain index, $T_f$ is the block length and $\Delta f$ is the sub-band (tone) spacing.

Following Eq. (5), the frequency response at the k-th tone of an n-th block of OFDM symbols corresponding to an i-th transmit antenna can be expressed by Eq.(6):

$$H_i[n, k] = \sum_{l=0}^{K_o - 1} h_i[n, l] W_K^{kl}. \quad (6)$$

Equation (6) demonstrates that $H_i[n, k]$ can be obtained by estimating or otherwise acquiring $h_i[n, k]$. Accordingly, the received signal r[n, k] at each receive antenna 140-1, 140-2, . . . 140-M can be expressed by Eq. (7):

$$r[n, k] = \sum_{i=1}^{M} H_i[n, k] t_i[n, k] + w[n, k], \quad (7)$$

where M is the number of transmit antennas, k denotes a particular OFDM sub-band and k=0, 1, . . . , K−1 for all n blocks. If the transmitted signals $t_i[n, k]$'s from each transmit antenna contain known signals such as training symbols, the temporal estimation of the various communication channels $h_i[n, l]$'s can be derived using Eq. (8):

$$\begin{pmatrix} Q_{11}[n] & Q_{12}[n] & \cdots & Q_{1P}[n] \\ Q_{21}[n] & Q_{22}[n] & & \vdots \\ \vdots & & \ddots & \\ Q_{PI}[n] & \cdots & & Q_{PP}[n] \end{pmatrix} \begin{pmatrix} \tilde{h}_1[n] \\ \tilde{h}_2[n] \\ \vdots \\ \tilde{h}_P[n] \end{pmatrix} = \begin{pmatrix} p_1[n] \\ p_2[n] \\ \vdots \\ p_P[n] \end{pmatrix}, \quad (8)$$

or $$\begin{pmatrix} \tilde{h}_1[n] \\ \tilde{h}_2[n] \\ \vdots \\ \tilde{h}_P[n] \end{pmatrix} = \begin{pmatrix} Q_{11}[n] & Q_{12}[n] & \cdots & Q_{1P}[n] \\ Q_{21}[n] & Q_{22}[n] & & \vdots \\ \vdots & & \ddots & \\ Q_{PI}[n] & \cdots & & Q_{PP}[n] \end{pmatrix}^{-1} \begin{pmatrix} p_1[n] \\ p_2[n] \\ \vdots \\ p_P[n] \end{pmatrix}, \quad (9)$$

where $$\tilde{h}_i[n] \triangleq (\tilde{h}_i[n, 0] \ldots , \tilde{h}_i[n, K_o - 1])^T, \quad (10)$$

$$Q_{ij}[n] \triangleq (q_{ij}[n, i - j])_{i,j=1}^{K_o}, \text{ and} \quad (11)$$

$$p_i[n] \triangleq (p_i[n, 0], \ldots , p_i[n, K_o - 1])^T, \quad (12)$$

where $\tilde{h}_i[n]$ is the estimated channel impulse response for the channel between an i-th transmit antenna and a particular receive antenna, $Q_{ij}[n]$ is the correlated energy between the set of training symbols $t_i[n, k]$ of an i-th transmit antenna and the set of training symbols $t_j[n, k]$ of a j-th transmit antenna and $p_i[n]$ is the cross-correlation vector between the set of training symbols $t_i[n, k]$ of an i-th transmit antenna and a received signal $r[n, k]$ at a particular receive antenna, and where:

$$q_{ij}[n, l] \triangleq \sum_{k=0}^{K-1} t_i[n, k]t_j^*[n, k]W_K^{-kl}, \text{ or alternatively,} \quad (13)$$

$$q_{ij}[n, l] \triangleq IFFT\{t_i[n, k]t_j^*[n, k]\}, \text{ and} \quad (14)$$

$$p_i[n, l] \triangleq \sum_{k=0}^{K-1} r[n, k]t_i^*[n, k]W_K^{-kl}, \text{ or alternatively,} \quad (15)$$

$$p_i[n, l] \triangleq IFFT\{r[n, k]t_i^*[n, k]\}. \quad (16)$$

From Eqs. (8) and (9), one can see that a matrix inversion is required to get the temporal estimation of each channel impulse response $h_i[n, k]$, i.e., $\tilde{H} = Q^{-1} P$.

Figure 2:
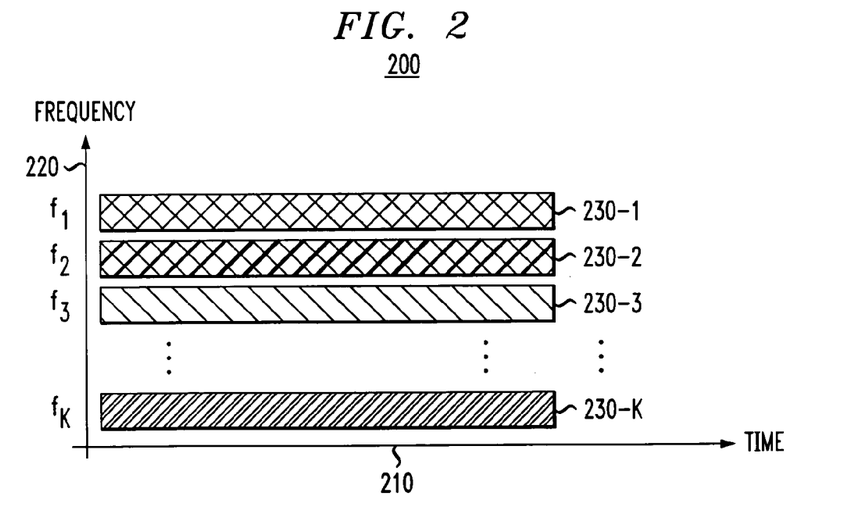
FIG. 2 depicts an OFDM signal having multiple sub-bands.
Figure 3:
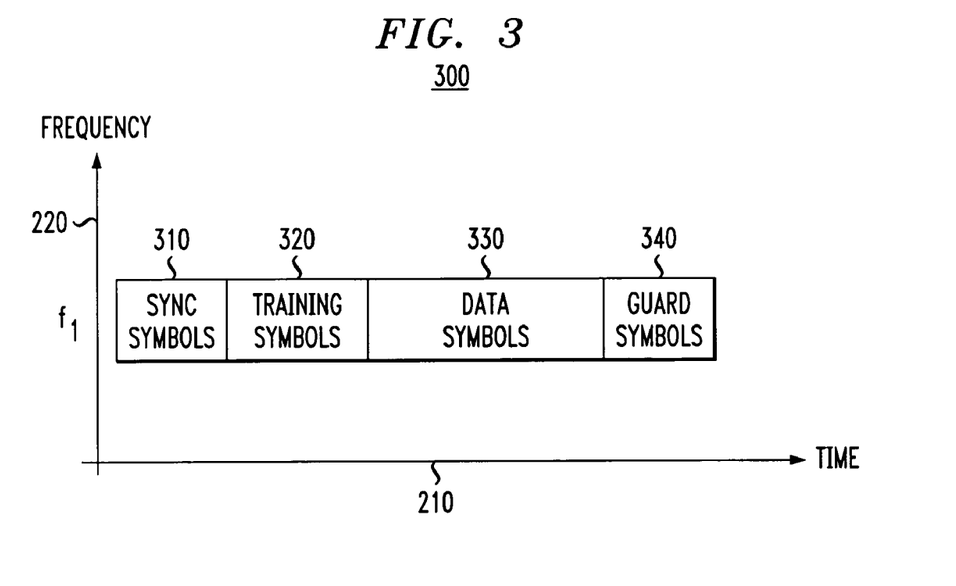
FIG. 3 depicts an exemplary communication signal of an OFDM sub-band.

FIG. 2 depicts an exemplary OFDM signal 200 displayed along a time axis 210 and against a frequency axis 220. As shown in FIG. 2, the OFDM signal 200 contains a number of individual sub-bands (tones) 230-1, 230-2, ... 230-K with each respective sub-band centered on a respective one of closely spaced frequencies $f_1, f_2, \ldots f_K$. FIG. 3 depicts an exemplary communication signal 300 capable of being embedded in the various sub-bands of FIG. 2. As shown in FIG. 3, the communication signal 300 contains a number of sync symbols 310, a number of training symbols 320, a number of data symbols 330 and a number of guard symbols 340.

Data symbols, also known as payload symbols, can contain information to be transmitted. Guard symbols are symbols that can pad either or both of the beginning and end of a burst transmission and can be used for a variety of purposes including providing buffering, timing and synchronization. Sync symbols are predetermined symbols placed at various strategic positions within a block of data that can allow a receiver to synchronize or otherwise extract timing information from a transmitted signal.

Training symbols, like sync symbols, can be predetermined symbols placed at known positions. However, unlike sync symbols, training symbols are usually configured to enable an equalizer to estimate a given communication channel. It should be appreciated that, in various exemplary embodiments, the training symbols 320 can be any set of symbols suitable for training an equalizer. For example, the exemplary training symbols 320 can be formed taking into account various factors such as their suitability for clock recovery, frequency-shift estimation, their peak-to-average ratio of signal strength or any other known or later recognized factor useful for generating an advantageous or otherwise adequate training sequence.

As discussed above, training symbols can be selected such that inverting the cross-correlation matrix Q in Eq. (8)

can be simplified. For example, various sets of training symbols can be selected such that a correlation between two different sets of training symbols is zero, thus reducing Eq. (9) above to the form of Eq. (17) below:

$$\begin{pmatrix} \tilde{h}_1[n] \\ \tilde{h}_2[n] \\ \vdots \\ \tilde{h}_i[n] \end{pmatrix} = \begin{pmatrix} Q_{11}[0] & 0 & \cdots & 0 \\ 0 & Q_{22}[0] & & 0 \\ \vdots & & \ddots & \vdots \\ 0 & 0 & \cdots & Q_{ij}[n] \end{pmatrix}^{-1} \begin{pmatrix} p_1[n] \\ p_2[n] \\ \vdots \\ p_i[n] \end{pmatrix} \quad (17)$$

Because all off-axis elements of the Q matrix are zero, determining the inverse matrix $Q^{-1}$ can be greatly simplified. Furthermore, when the various transmitted signals are transmitted using a constant-modulus technique such as quadrature amplitude modulated (QAM), the absolute values of any transmitted symbols will be equal to one, i.e., $(|t_i[n, k]|=1)$, the cross-correlation matrix Q can be reduced to $Q = K \times I$, for all $i = 1, 2, \ldots N$, and Eq. (17) can be further reduced to the form of Eq. (18):

$$\begin{pmatrix} \tilde{h}_1[n] \\ \tilde{h}_2[n] \\ \vdots \\ \tilde{h}_i[n] \end{pmatrix} = \begin{pmatrix} K & 0 & \cdots & 0 \\ 0 & K & & \vdots \\ \vdots & & \ddots & 0 \\ 0 & \cdots & 0 & K \end{pmatrix}^{-1} \begin{pmatrix} p_1[n] \\ p_2[n] \\ \vdots \\ p_i[n] \end{pmatrix}, \text{ or} \quad (18)$$

$$\begin{pmatrix} \tilde{h}_1[n] \\ \tilde{h}_2[n] \\ \vdots \\ \tilde{h}_i[n] \end{pmatrix} = \frac{1}{K} \begin{pmatrix} 1 & 0 & \cdots & 0 \\ 0 & 1 & & \vdots \\ \vdots & & \ddots & 0 \\ 0 & \cdots & 0 & 1 \end{pmatrix} \begin{pmatrix} p_1[n] \\ p_2[n] \\ \vdots \\ p_i[n] \end{pmatrix} \quad (19)$$

Accordingly, the problem of determining channel characteristics can be reduced to solving Eq. (20):

$$h_i[n, l] = \frac{1}{K} p_i[n, l], \text{ or alternatively} \quad (20)$$

$$h_i[n, l] = \frac{1}{K} p_1[n, l - (i-1)\overline{K}_o] \quad (21)$$

for $l = 0, \ldots, \overline{K}_0 - 1$, where $\overline{K}_0$ is a number of samples and $i = 1, 2, \ldots, N$. Further details about the exemplary training symbols can be found in at least "Optimum training Sequences for Wireless Systems" by Ye LI (U.S. patent application Ser. No. 09/862,755, concurrently filed and commonly assigned) incorporated herein by reference in its entirety including all references cited therein.

Returning to FIG. 3, it should be appreciated that, while the exemplary communication signal 300 is a burst signal with a particular form, it should be appreciated that the form of a burst signal can vary without departing from the spirit and scope of the present invention. For example, it should be appreciated that the training symbols 320 can be dispersed intermittently within the payload symbols 330. It should further be appreciated that while the exemplary communication signal 300 is a burst signal, the communication signal 300 can take various other forms such as a continuous signal in which various training symbols can be periodically embedded.

Figure 4:
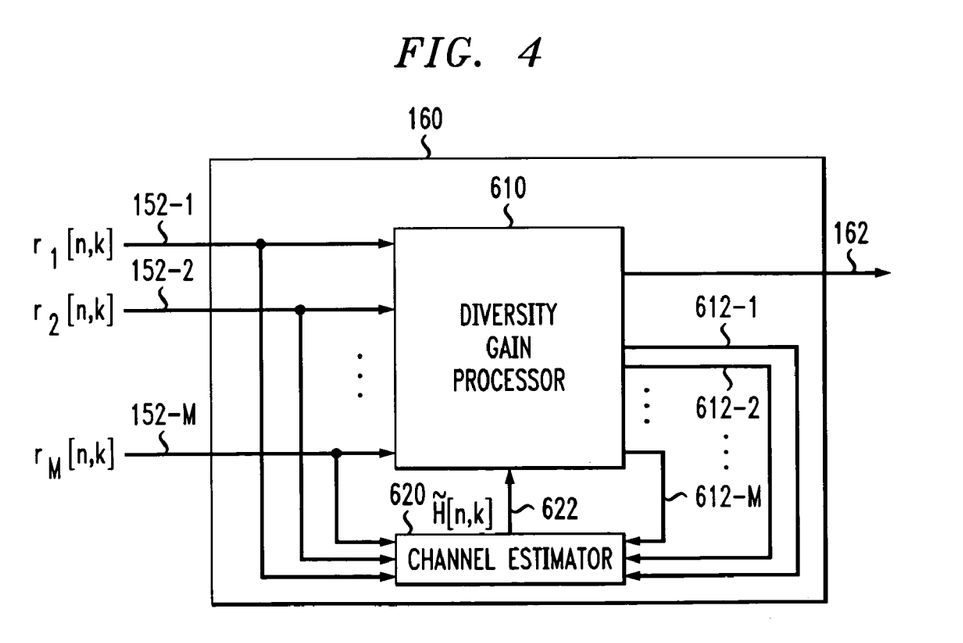
FIG. 4 is a block diagram of an equalizer with an exemplary channel estimator.

FIG. 4 is a block diagram of the exemplary equalizer 160 of FIG. 1. The exemplary equalizer 160 includes a diversity gain processor 610 and a channel estimator 620.

In operation, the diversity gain processor 610 and channel estimator 620 can each receive various received signals $r_1[n, k]$, $r_2[n, k]$, . . . $r_M[n, k]$ such as blocks of symbols from OFDM transmissions via links 152-1, 152-2, . . . 152-M. The channel estimator 620 can then determine a set of initial channel estimates for each communication channel between a transmit/receive antenna pair.

As discussed above, each of the received signals $r_i[n, k]$ can contain multiple transmit signals $t_i[n, k]$'s according to Eq. (7) above transmitted by a plurality of transmit antennas, with each transmit signal $t_i[n, k]$ having an assortment of sync symbols, training symbols, data symbols and guard symbols, as well as any other symbol types. Also as discussed above, the training symbols embedded in the communication signals for each of the transmit signals $t_i[n, k]$ can be known symbol patterns and formed such that there is essentially no cross-correlated energy between each set of training symbols, i.e., $q_{ij}[n, 1]=0$ for all $i \neq j$ such that a set of initial channel estimates can be determined using Eq. (18) above. Furthermore, when a QAM or other constant-modulus approach is used, a set of initial channel estimates can be determined using Eqs. (20) or (21) above. However, the particular form and respective computational efficiency of the training symbols can vary and can include any combination or sequence of symbols that can be used to determine the characteristic estimates of a communication channel without departing from the spirit and scope of the present invention.

While the exemplary estimator 620 can use a set of training symbols to determine a set of initial channel estimates, it should be appreciated that the estimator 620 can alternatively use any other symbol type, including data symbols, to determine sets of initial channel estimates. Still further, it should be appreciated that the exemplary estimator 160 can use any other known or later developed technique suitable to produce initial channel estimates without departing from the spirit and scope of the present invention.

After the communication channels have been initially characterized, the channel estimator 620 can export the sets of initial channel estimates to the diversity gain processor 610, which can use the sets of channel estimates to provide spatial and temporal equalization on the received signals and produce streams of symbol decisions $t'_i[n, k]$ that can be exported to an external device (not shown) via link 162 and/or exported to the channel estimator 620 via links 612-1, 612-2, . . . 612-M.

As discussed above, because the channel characteristics can vary over time, especially in mobile communication system, it can be advantageous to periodically update, or adapt, a set of initial channel estimates. To determine updated channel estimates, one can start by reducing Eqs. (8) or (9) to the form of Eq. (22) below:

$$Q_{ii}[n]\tilde{h}_i[n] = p_i[n] - \sum_{g=1}^{i \neq g} Q_{gi}[n]\tilde{h}_g[n] \qquad (22)$$

Then, when a communication system uses a constant modulus signal such as QAM, the correlation terms $Q_{11}[n] = Q_{22}[n] = \ldots = Q_{NN}[n] = K$ and Eq. (22) can be further reduced to Eq. (23) below:

$$\tilde{h}_i[n] = \frac{1}{K}\left(p_i[n] - \sum_{g=1}^{i \neq g} Q_{gi}[n]\tilde{h}_g[n]\right) \qquad (23)$$

Equation (23) suggests that, if each $\tilde{h}_g[n]$ is known, then the $\tilde{h}_i[n]$ terms can be determined without a matrix inversion. Unfortunately, given that $\tilde{h}_i[n]$ is unknown, then $\tilde{h}_g[n]$ will not likely be known. However, by substituting a previously estimated channel estimate $\tilde{h}_g[n-1]$ for each $\tilde{h}_g[n]$ in Eq. (23), Eq. (23) can be rewritten to the form of Eq. (24):

$$\tilde{h}_i[n] = \frac{1}{K}\left(p_i[n] - \sum_{g=1}^{i \neq g} Q_{gi}[n]\tilde{h}_g[n-1]\right) \qquad (24)$$

While substituting $\tilde{h}_g[n-1]$ for each $\tilde{h}_g[n]$ can cause minor performance degradation, elimination of a matrix inversion using Eq. (24) can lead to major reductions in computational complexity.

Returning to FIG. 4, it should be appreciated that Eq. (24) suggests that the estimator 620 can produce updated channel estimates if the estimator 620 has access to previously determined channel estimates and known transmitted signals. While the estimator 620 can obviously retain past channel estimates, the estimator 620 must still find a source for known transmitted signals.

Fortunately, as discussed above, the diversity gain processor 610 can provide streams of symbol decisions $t'_i[n, k]$ to the estimator 620. If properly equalized, the symbol decisions $t'_i[n, k]$ produced by the diversity gain processor 610 are likely the same as the transmitted symbols $t'_i[n, k]$. Accordingly, the estimator 620 can use the streams of symbol decisions $t'_i[n, k]$ as a substitute for $t_i[n, k]$ in Eqs. (13)–(16) above and determine sets of updated channel estimates using Eq. (24) above.

As the sets of updated channel estimates are produced, the estimator 620 can provide the sets of updated channel estimates to the diversity gain processor 610. The diversity gain processor 610, in turn, can use the sets of updated channel estimates to better equalize subsequently processed data symbols and produce streams of symbol decisions. The cycle of updating the channel estimates, adaptively equalizing the received signals and feeding symbol decisions back to the estimator 620 can then continue as required.

Figure 5:
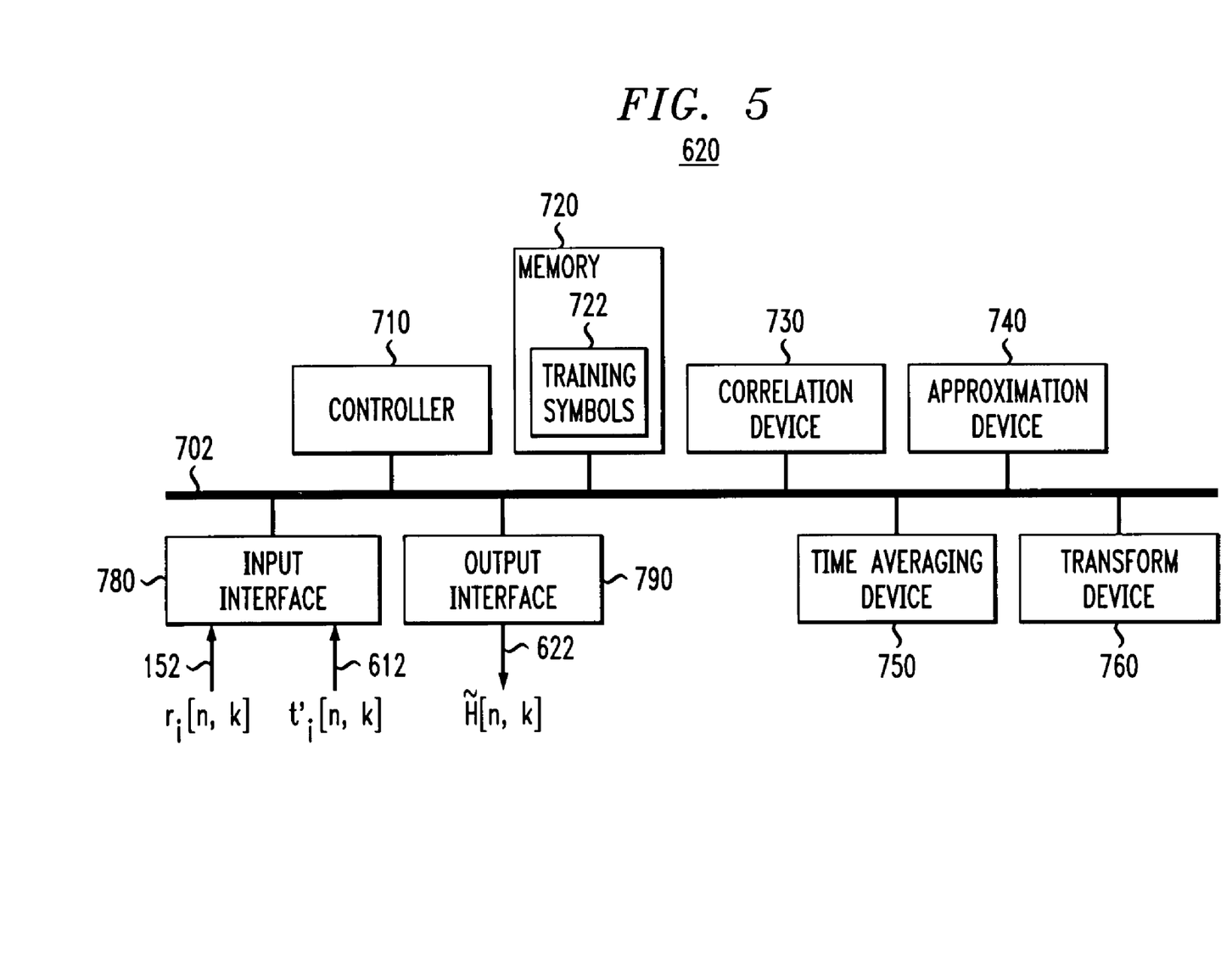
FIG. 5 is a block diagram of the exemplary channel estimator of FIG. 4.

FIG. 5 is a block diagram of the estimator 620 of FIG. 4. The estimator 620 includes a controller 710, a memory 720 that contains various training symbols 722, a correlation device 730, an approximation device 740, a time averaging device 750, a transform device 760, an input interface 780 and an output interface 790. The various components 710–790 are coupled together by control/data bus 702. Although the exemplary estimator 620 uses a bussed architecture, it should be appreciated that any other architecture may be used as is well-known to those of ordinary skill in the art.

In a first mode of operation, under control of the controller 710, the input interface 780 can receive various known symbols via link 152, and store the received symbols in the memory 720. Next, the controller 710 can transfer the received symbols, as well as the training symbols 722 to the correlation device 730. The correlation device 730 then can cross-correlate the received and training symbols according to Eqs. (15) or (16) above, and can further correlate the various training symbols according to Eqs. (13) or (14) above to produce first correlation products $p_i[n, 1]$ and second correlation products $q_{ij}[n, 1]$ respectively.

The first and second correlation products can then be transferred to the approximation device 740, where the approximation device 740 can produce a set of initial channel estimates according to Eqs. (17)–(21) above. The initial set of channel estimates can then be exported to an external device (not shown) using the output interface 790 and link 622.

While the first mode of operation can produce an initial set of channel estimates using Eqs. (13)–(21) above, it should be appreciated that the initial set of channel estimates can alternatively be produced by any other known or later developed technique that can determine or otherwise provide initial sets of channel estimates without departing from the spirit and scope of the present invention.

In a second mode of operation, under control of the controller 710, the input interface 780 can accept other received symbols $r_i[n, k]$ via link 152 and also accept respective decision symbols $t'_i[n, k]$ via link 612, which can then be stored in memory 720.

Next, the controller 710 can transfer the various received symbols and decision symbols to the correlation device 730, where the correlation device 730 can again form various first and second correlation products according to Eqs. (13)–(16) above. The correlation device 730 can then export the first and second correlation products to the approximation device 740.

The approximation device 740 can receive the first and second correlation products and perform a first pre-estimation process according to Eqs. (25) or (26) below to produce sets of pre-estimates $\bar{h}_i[n]$:

$$\bar{h}_i[n] = \frac{1}{K} p_i[n] \text{ for } n = 1 \tag{25}$$

$$\bar{h}_i[n] = \frac{1}{K}\left(p_i[n] - \sum_{g=1}^{i \neq g} Q_{gi}[n]\tilde{h}_g[n-1]\right) \text{ for } n = 2, 3, 4 \ldots \tag{26}$$

As shown by Eq. (25), if a first block n is being processed, i.e., the estimator 620 is estimating a set of initial channel estimates without training symbols, the set of initial channel pre-estimates are proportional to the first correlation products $p_i[n] = \{\Sigma p_i[n, 1]\}$, where $l=1, 2, \ldots M\}$. However, for subsequent blocks of data, or when an initial set of channel estimates has been otherwise provided, the approximation device 740 can produce various sets of pre-estimates according to Eq. (26). Once the approximation device 740 has determined the appropriate sets of pre-estimates, the approximation device 740 can export the sets of pre-estimates to the time averaging device 750.

The time averaging device 750 can receive the sets of pre-estimates and perform a time averaging operation on pre-estimates to produce sets of time-averaged estimates according to Eq. (27) below:

$$\hat{h}_i[n, l] = \Phi(\bar{h}_i[n, l]) = \sum_{m=0} f_k \bar{h}_i[n-m, l], \tag{27}$$

where $f_k$ is a time-averaging coefficient. Details about time-averaging coefficients can be found in at least "Channel Estimation for OFDM Systems with Transmitter Diversity" by Li, Y. and Ariyavisitakul, S. (U.S. patent application Ser. No. 09/215,074) herein incorporated by reference in its entirety.

While the exemplary time averaging device 750 uses the approach outlined by Eq. (27), it should be appreciated that, in various embodiments, the time averaging device 750 can determine or otherwise approximate time-averaged estimates according to any known or later developed technique without departing from the spirit and scope of the present invention.

After the time averaging device 750 produces the sets of time-averaged estimates, the sets of time-averaged estimates can be provided to the transform device 760 where the transform device 760 can determine sets of updated channel estimates according to Eq. (28) below:

$$\hat{H}_i[n,k] = FFT\{\hat{h}[n,l]\} \tag{28}$$

While the exemplary transform device 760 produces sets of updated channel estimates using a fast Fourier transform (FFT), it should be appreciated that any other known or later developed technique or approach that can determine or otherwise approximate channel estimates using time-averaged estimates can be used, such as a direct Fourier transform, a convolution process and the like, without departing from the spirit and scope of the present invention.

After the transform device has produced the various updated channel estimates, the transform device 760 can export the sets of updated channel estimates via the output interface 790 and link 622 to an external device. The estimator 620 can then repeat the process of importing and processing various received symbols and decision symbols to produce sets of updated channel estimates such that an equalizer using the updated estimates can adaptively track the changing characteristics of various communication channels and extract information from various received signals.

Figure 6:
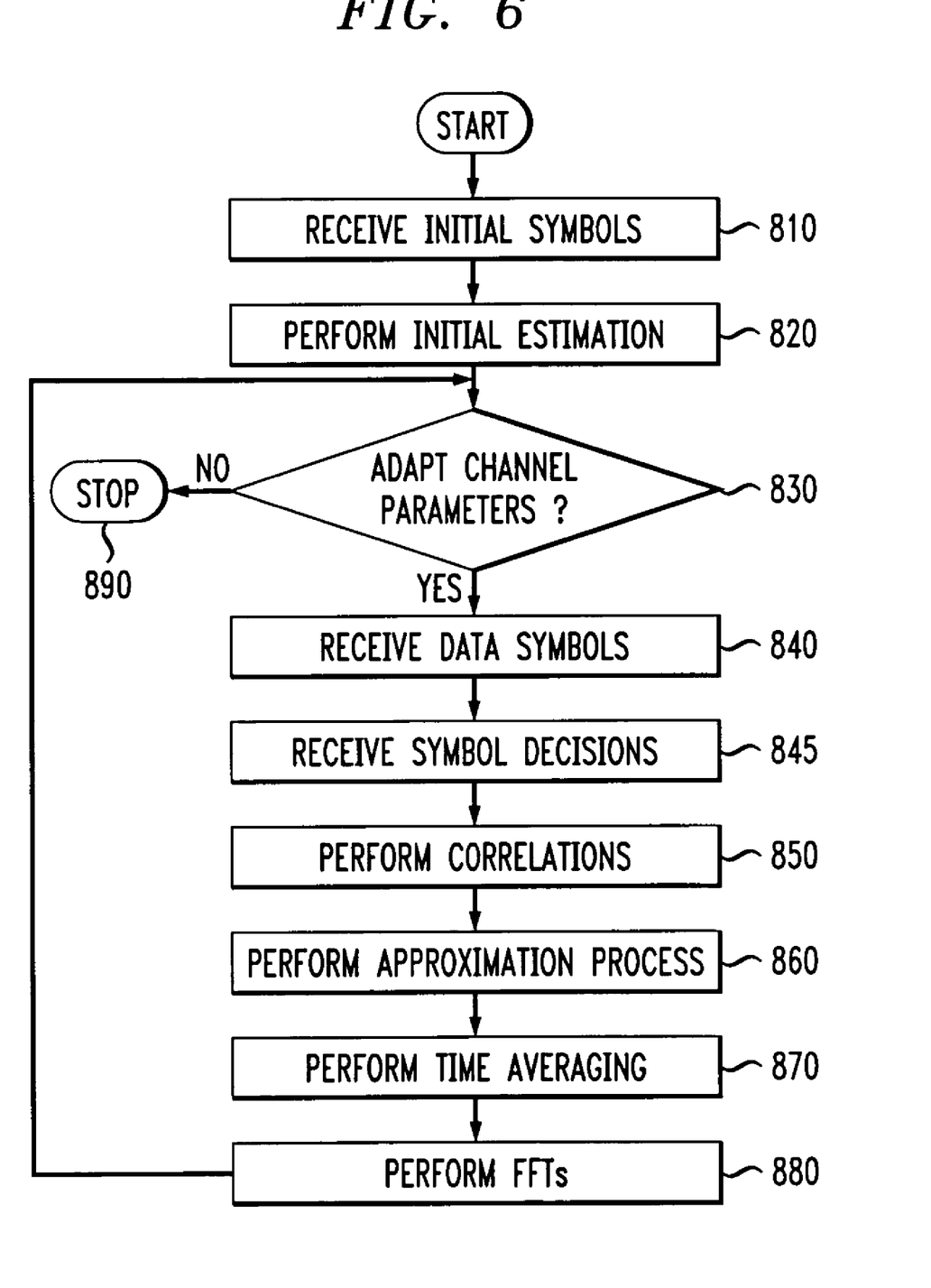
FIG. 6 is a flowchart outlining an exemplary technique for estimating communication channels.

FIG. 6 is a flowchart outlining an exemplary technique for producing various channel estimates according to the present invention. The operation starts in step 810 where a set of initial symbols is received. Next, in step 820, a set of initial channel estimates is produced using the received symbols as well as various known training symbols according Eqs. (13)–(16) above. While the exemplary technique produces initial sets of channel estimates using known training symbols such as training symbols, as discussed above, the sets of initial channel estimates alternatively can be derived without training symbols using Eqs. (25)–(26) above. In still other embodiments, it should be appreciated that the sets of initial channel estimates can be derived or otherwise provided by any other known or later developed technique without departing from the spirit and scope of the present invention. The operation continues to step 830.

In step 830, a determination is made as to whether to update, or adapt, the sets of initial channel estimates. If the sets of initial channel estimates are to be adapted, control continues to step 840; otherwise, control jumps to step 890 where the process stops.

In step 840, further received symbols are accepted. Next, in step 845, various respective symbol decisions are also accepted. Then, in step 850, the received symbols and symbol decisions are correlated according to Eqs. (13)–(16) above to produce first and second correlation products. Control continues to step 860.

In step 860, an approximation technique is performed on the first and second correlation products to produce sets of pre-estimates according to Eqs. (25) or (26) above depending on whether initial sets of channel estimates are available.

Next, in step 870, a time averaging operation is performed on the sets of pre-estimates to produce sets of time-averaged estimates. Control continues to step 880.

In step 880, a transform is performed on the time-averaged estimates to produce sets of updated channel estimates. While the exemplary transform is a fast Fourier transform, as discussed above, any known or later developed transform useful to derive or otherwise approximate channel estimates using time-averaged estimates can be used without departing from the spirit and scope of the present invention. Control can then jump back to step 830 where another decision can be taken to update the various channel estimates. The various channel estimates can be continually updated according to steps 830–880 above until it is desirable or otherwise required to stop channel adaptation.

As shown in FIG. 1–5, the systems and methods of this invention are preferably implemented on a digital signal processor (DSP) or other integrated circuits. However, the systems and methods can also be implemented using any combination of one or more general purpose computers, special purpose computers, program microprocessors or microcontrollers and peripheral integrating circuit elements, hardware electronic or logic circuits such as application specific integrated circuits (ASICs), discrete element circuits, programmable logic devices such as PODs, POAs, FPGAs, PALs or the like. In general, any device on which exists a finite state machine capable of implementing the various elements of FIGS. 1–5 and the flowchart of FIG. 6 can be used to implement the estimation functions.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the present invention.

What is claimed is:

1. A method of characterizing one or more communication channels, comprising:
    receiving a set of first symbols associated with a first communication channel;
    receiving a set of second symbols associated with a second communication channel;
    characterizing at least a first communication channel based on at least the set of first symbols and the set of second symbols to produce a set of first channel characteristics;
    wherein characterizing one or more communication channels is performed by selecting a plurality of training symbols disposed within said at least the set of first symbols and the set of second symbols, where a correlation between two different sets of said training symbols is zero;
    wherein at least the first communication channel is based on a constant-modulus technique;
    wherein characterizing the first communication channel includes;
        performing a first correlation to produce a set of first correlations; and
        determining the set of first channel characteristics based on at least the set of first correlations;
    wherein determining the set of first channel characteristics includes determining at least a set of first pre-estimates $\bar{h}_1[n]$;
    wherein the set of first pre-estimates $\bar{h}_1[n]$ is determined based on an equation:

$$\bar{h}_i[n] = \frac{1}{K} p_i[n],$$

wherein $p_i[n]$ is the set of first correlations and K is a constant; and
    wherein characterizing the first communication channel further includes time-averaging at least one pre-estimate to produce a set of time-averaged estimates.

2. The method of claim 1, wherein characterizing the first communication channel further includes performing a transform on the set of time-averaged estimates to produce a set of channel characteristics.

3. A method of characterizing one or more communication channels, comprising:
    receiving a set of first symbols associated with a first communication channel;
    receiving a set of second symbols associated with a second communication channel;
    characterizing at least a first communication channel based on at least the set of first symbols and the set of second symbols to produce a set of first channel characteristics;
    wherein characterizing one or more communication channels is performed by selecting a plurality of training symbols disposed within said at least the set of first symbols and the set of second symbols, where a correlation between two different sets of said training symbols is zero;
    wherein characterizing the first communication channel includes:
        performing a first correlation to produce a set of first correlations;
        performing a second correlation to produce a set of second correlations; and
        determining a set of channel pre-estimates based on at least the first correlation product and the second correlation product;
    wherein determining the set of first channel characteristics includes determining at least a set of first pre-estimates $\bar{h}_1[n]$; and
    wherein the set of first pre-estimates $\bar{h}_1[n]$ is determined based on an equation:

$$\bar{h}_i[n] = \frac{1}{K}\left( p_i[n] - \sum_{g=1}^{i \neq g} Q_{gi}[n]\bar{h}_g[n-1] \right),$$

wherein $p_i[n]$ is related to the set of first correlations, $Q_{gi}[n]$ is related to the set of second correlations, and K is a constant and $\bar{h}_g[n-1]$ is related to set of previously determined channel characteristics.

4. A method of characterizing one or more communication channels, comprising:
    receiving a set of first symbols associated with a first communication channel;
    receiving a set of second symbols associated with a second communication channel;
    characterizing at least a first communication channel based on at least the set of first symbols and the set of second symbols to produce a set of first channel characteristics;
    wherein characterizing one or more communication channels is performed by selecting a plurality of training symbols disposed within said at least the set of first symbols and the set of second symbols, where a correlation between two different sets of said training symbols is zero;
wherein characterizing the first communication channel includes:
  performing a first correlation to produce a set of first correlations;
  performing a second correlation to produce a set of second correlations; and
  determining a set of channel pre-estimates based on at least the first correlation product and the second correlation product;

wherein determining the set of first channel characteristics includes determining at least a set of first pre-estimates $\overline{h}_1[n]$; and
wherein characterizing the first communication channel further includes time-averaging at least one pre-estimate to produce a set of time-averaged estimates.

5. The method of claim 4, wherein characterizing the first communication channel further includes performing a transform on the set of time-averaged estimates to produce a set of channel characteristics.

* * * * *